United States Patent [19]
Zaccardelli et al.

[11] 3,874,808
[45] Apr. 1, 1975

[54] DRILL BUSHING

[75] Inventors: Richard A. Zaccardelli, Ames;
Robert L. McClendon, Pontiac;
Donald R. Opatrny, Waterford, all of Mich.

[73] Assignee: Briney Bushing, Inc., Pontiac, Mich.

[22] Filed: Nov. 1, 1973

[21] Appl. No.: 411,779

[52] U.S. Cl. .................. 408/1, 408/56, 408/72 B, 408/115 B
[51] Int. Cl. .................. B23b 35/00, B23b 49/02
[58] Field of Search ............ 408/56, 1, 72 B, 115 B, 408/241 B

[56] References Cited
UNITED STATES PATENTS
| | | | |
|---|---|---|---|
| 1,617,554 | 2/1927 | Swartz | 408/241 B |
| 2,491,635 | 12/1949 | Allen, Jr. | 408/56 |
| 2,669,889 | 2/1954 | Huller | 408/72 B X |

*Primary Examiner*—Andrew R. Juhasz
*Assistant Examiner*—Z. R. Bilinsky
*Attorney, Agent, or Firm*—McNenny, Farrington, Pearne & Gordon

[57] ABSTRACT

A drill bushing having directed coolant flow passages and chip breaking surfaces on an integral sleevelike body. The coolant passages are disposed on the body to direct liquid coolant and lubricant to a zone forward of the body to continuously strip chips laterally from a rotating tool extending through the bushing. The chip breaking surfaces, formed on the forward end face of the bushing, simultaneously shear the deflected chips into harmless fragments. The disclosed arrangement, by operating on the chips in a zone ahead of the bushing, greatly reduces chip movement through the bushing and thereby greatly extends tool and bushing life.

11 Claims, 2 Drawing Figures

DRILL BUSHING

BACKGROUND OF THE INVENTION

The invention relates to improvements in drill bushings and, more specifically, pertains to a drill bushing having means for directing liquid coolant on a tool and workpiece and means for simultaneously breaking chips produced by the tool.

DESCRIPTION OF THE PRIOR ART

Drill bushings in the form of cylindrical sleeves have been widely used in various applications to radially support and axially guide drills, reamers, and other rotating tools. Various means have been proposed in connection with such bushings to improve cutting efficiency and chip flow at the cutting station. Examples of the prior art are disclosed in U.S. Pat. Nos. 2,491,635; 2,375,367; 2,669,889; and 2,510,203. In general, devices such as shown in these references have provided chip breaking means or means for supplyinig liquid coolant and lubricant to the tool, and in certain supplying have provided both functions. Prior devices, though, have generally not efficiently integrated chip breaking and liquid coolant supply structures.

Besides having limited efficiency, such prior arrangements have often relied on parts requiring complicated machining for their manufacture and external pipe connections at their point of use. As a result, the prior arrangements have been relatively expensive both in initial cost and installation. Moreover, these earlier devices have generally not always produced completely satisfactory results under diverse conditions normally encountered with currently used materials and machine tools.

SUMMARY OF THE INVENTION

The invention provides an improved drill bushing having flow passages adapted to direct separate liquid streams on a tool forward of the bushing to deflect chips laterally from the tool and having a plurality of chip breaking elements on a forward end face of the bushing to operate on the deflected chips. The stripping action of the individual fluid streams in an open zone ahead of the chip breaking surfaces and the bushing itself produces more positive chip control than has been previously achieved, and reduces or eliminates troublesome chip movement through the bushing. At the same time, continuous break-up and the removal of chips prevents chip pile-ups along the tool path, thereby permitting liquid coolant and lubricant to reliably reach the tool cutting edges.

In accordance with the invention, the drill bushing includes both the chip breaking surfaces and the directed coolant flow passages in a unitary body, with the structural and functional relationships of these elements so arranged as to produce unexpected, substantial increases in efficiency. Chip breaking surfaces and flow passages are disposed relative to one another and the work zone in a manner where the simultaneous action of each complements that of the other and, together, their total effect on machining efficiency is measurably greater than the sum of their individual effects. The superior performance of the bushing has been demonstrated in specific instances of drastically increased tool life and substantially complete elimination of hazardous accumulations of chips in the tool area. Other advantages of the bushing include longer bushing life, higher practical cutting speeds, greater depths of cuts, reduced noise, and higher overall productivity. The suitability of the bushing for practically all general applications is evidenced by these various benefits.

In the preferred embodiment, the drill bushing is formed as a cylindrical sleeve having its forward or work-facing end provided with circumferentially spaced, radial notches adapted to admit and shear chips rotating with the tool relative to the bushing. Directed flow passages are formed by holes drilled from points in the forward end face intermediate the notches. The holes extend axially rearward and radially outward in the bushing wall to individual ports on the exterior of the bushing midway along its length. Assembled with the bushing is a cylindrical liner or sleeve having an inside diameter closely fitting the bushing outer diameter. The sleeve is provided with an internal annulus or groove acting as a manifold to supply the bushing ports and directed flow passages. The disclosed bushing and sleeve combination provides a structurally simple, inexpensive means for greatly improving machining efficiency. The bushing assembly, additionally, provides ready replaceability and interchangeability of its parts and simplificiation of liquid piping circuitry.

DESCRIPTION OF THE PREFERRED EMBODIMENT

Figure 1:
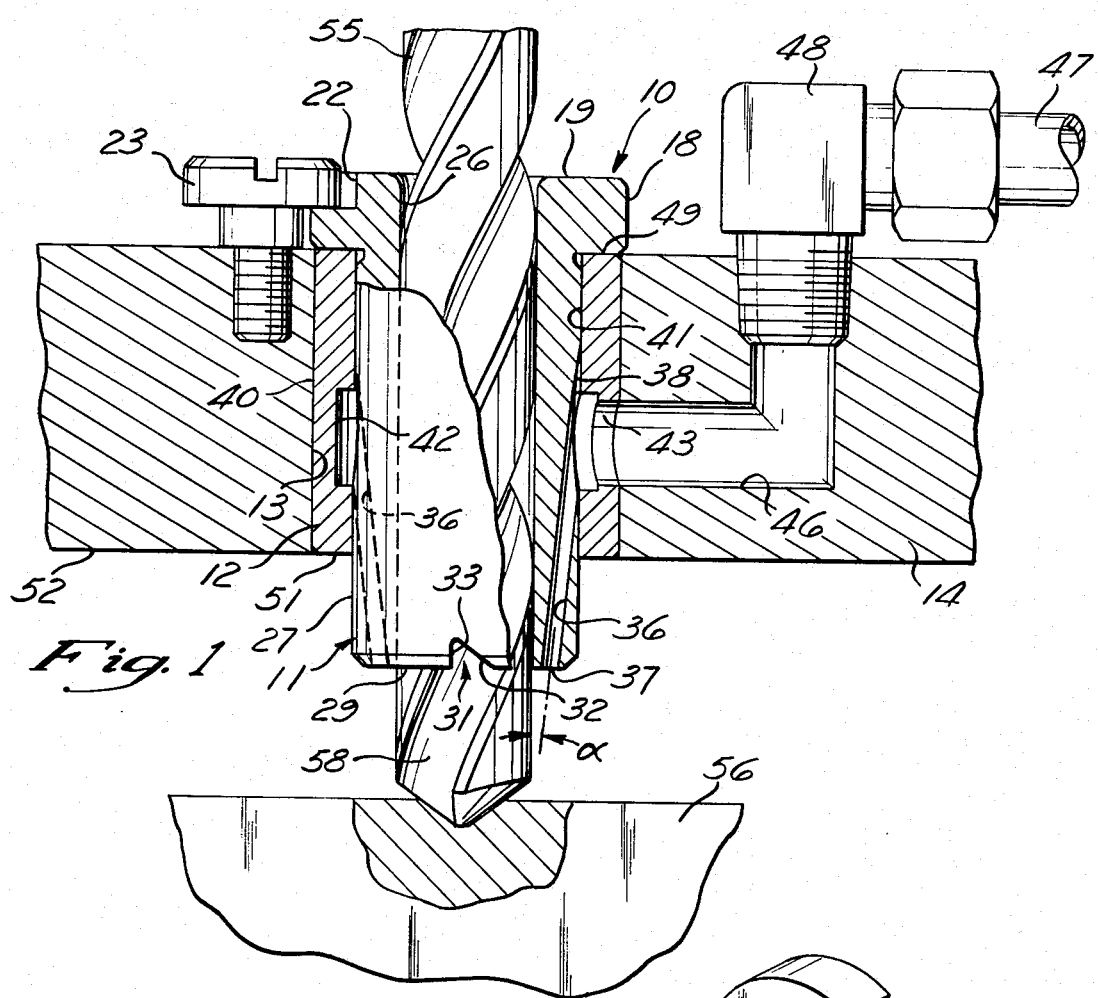
FIG. 1 is an elevational, sectional view of a typical installation of a bushing assembly constructed in accordance with the invention.
Figure 2:
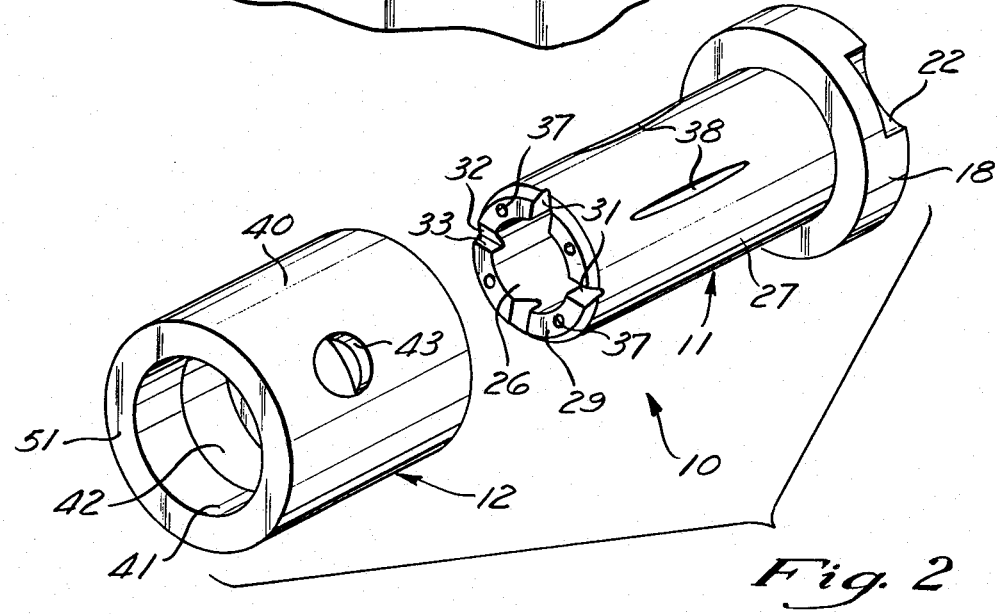
FIG. 2 is an exploded, perspective view of the bushing assembly.

A bushing assembly 10 embodying the invention preferably includes a tool guiding bushing 11 and a hole liner 12 for receiving the bushing therein. The liner 12 ideally is press-fitted or otherwise secured in a cylindrical hole 13 in a fixture or jig plate 14.

The bushing 11 is a cylindrical, tubular body having a radial flange or mounting head 18 forming a rearward end face 19. A recess or slot 22 is formed in the bushing head 18 for cooperation with a locking screw 23 threaded into the jig plate 14, to prevent rotation and axial movement of the bushing 11 in the plate. The bushing 11 is preferably formed of a hardened metal, such as tool steel, having a 62–64 Rockwell C hardness in its bore, designated 26. The inside cylindrical surface or bore 26 and outer cylindrical surface 27 are precision ground, preferably to American Standard Association sizes and tolerances, although the outside diameter may be ground oversize by the manufacturer and finish ground by the user.

A lower end face 29 of the bushing lies generally in a plane transverse to the axis of the bushing 11. Circumferentially spaced on the end face 29 are a plurality of notches 31 extending radially from the bore 26 to the outer surface 27. Each notch 31 includes a clearance surface 32 lying in a helically oriented plane and an associated chip shearing surface 33 lying in a generally radial plane. A series of directed flow passages 36 are drilled or otherwise formed in the bushing body 11 angularly spaced intermediate the notches 31. Each flow passage 36, ideally, lies in a radial plane and extends from a hole 37 in the end face 29 axially rearward and radially outward to the outer bushing surface 27, where it exits to form an elongated oval port 38 along the midportion of the bushing length. In certain instances, where the diameter of the bore 26 is necessarily relatively large in comparison to the diameter of the outer bushing surface 27, the passages 36 may break into the bore without a significant loss of bushing performance.

The liner 12, like the bushing 11, is ideally precision formed to ASA standards to provide at its inner cylindrical surface or bore 41 a relatively close, substantially fluid-tight fit with the bushing surface 27. An outer cylindrical surface 40 of the sleeve 12 is dimensioned relative to the jig plate hole 13 to provide a press fit, as mentioned. Along the midportion of the liner bore 41 is an annular groove or channel 42 which circumscribes an axial zone of the bushing 11 at which the elongated ports 38 are disposed. The groove 42 thus forms a manifold for the ports 38. The groove 42 communicates with an external source of fluid through a radial hole 43 in the sidewall of the liner 12. A liquid supply circuit is schematically represented by an internal passage 46 in the jig plate 14 to which a supply line 47 is connected by a fitting 48.

The length of the bushing 11 is preferably somewhat longer than that of the liner 12 so that when the upper end flange 18 of the bushing abuts an adjacent liner end face 49, the lower end face 29 of the bushing is somewhat below or forward of an adjacent end face 51 of the liner and a work facing side 52 of the jig plate 14. For example, the liner 12 may have a length corresponding to the thickness of the jig plate 14 at the work station, as shown, and the bushing may be a size larger in length than the liner 12, e.g., ¼ inch to ½ inch beyond the end of the liner.

Typically, the jig plate 14 and a workpiece, schematically shown at 56, are fixed relative to one another. A twist drill 55, or other rotary tool, extends through the bushing bore 26 and is guided thereby axially towards the workpiece 56. Desirably, the bushing end face 29 is disposed approximately ½ to 1½ tool diameters from the workpiece 56. Means, such as drill press (not shown), feeds the tool 55 towards the work as the tool is simultaneously rotated. At the same time, liquid coolant and/or lubricant is pumped through the line 47 and fitting 48 through the jig plate passage 46 to the liner hole 43 and annulus 42.

From the annulus 42, fluid escapes through the directed flow passages 36 as individual streams which impinge on the tool 55 forward of the bushing. Chips cut from the work travel axially rearwardly toward the bushing 11 along the flutes, designated 58, of the drill 55. These chips are struck and dislodged from the flutes 58 and other surfaces of the drill 55 by the jets of liquid escaping from the passages 36. It has been discovered that a relatively shallow angle α of impingement, in the order of 7 to 10 degrees from the axis of the tool, produces the most beneficial results. Deflection of the chips laterally from the tool 55 causes them to eventually move into the chip breaking notches 31, where they are continually sheared from the tool surfaces and broken up into fragments by the shearing surfaces 33. The broken chips do not tend to ball up or jam in local areas or pockets at the work station, as frequently occurs when chips are not otherwise broken up, particularly when stringy chips are produced by certain materials.

From the disclosed arrangement, it may be seen that chips are stripped away from the tool 55, ideally, before they enter the bushing bore 26 and before they pass the chip breaking surfaces 32, 33. This action substantially reduces the volume of chips passing up the flutes 58 of the tool 55 through the bushing 11, thereby reducing the risk of seizure between the bushing and tool and preventing premature wear of these members. Moreover, the demonstrated reliable chip breaking action of the shearing surfaces 33 prevents serious packing of chips in the tool flutes 58 so that continuous flow of liquid coolant and lubricant to the lead end of the tool is assured. By providing an extended length of the bushing 11 beyond the liner 12 and jig plate 14, adequate clearance is assured for lateral movement of broken chips across the face of the plate. Lateral support of the tool by the bushing is greater in this case than if the bushing were flush with the jig plate and the plate had the same spacing from the work.

While a preferred embodiment of the invention has been shown and described in detail, it is understood that the invention may take many other forms and embodiments, and such forms and embodiments as may occur to those skilled in the art may be resorted to without departing from the scope of the invention as defined in the following claims. For example, in certain instances, it may be desirable to omit the use of a hole liner, in which case an equivalent annular groove 42 may be formed directly in the jig plate 14 or in the bushing 11. The mounting flange 18 of the bushing may be omitted and/or a similar shoulder structure may be provided on the liner 12.

What is claimed is:

1. A drill bushing having an integral, sleevelike cylindrical body defining a longitudinal axis, the inside and outside cylindrical surfaces of said sleeve being precision formed to accurately guide a rotary tool for axial motion therein, said body having a forward end face generally transverse to its axis, a series of circumferentially spaced chip breaking notches in said end face adapted to break chips moving rearwardly relative to the bushing, said notches each being defined by first and second surfaces extending from the inside to the outside cylindrical sleeve surfaces, the first surface of each notch lying in a plane parallel to said axis, the second surface of each notch lying in a plane obliquely transverse to said axis, said first and second surfaces intersecting at a line spaced from said end face, a plurality of flow passages in the body for directing separate streams of liquid against a tool in the body forwardly of said end face whereby said chips are forced laterally away from said tool and eventually into said chip breaking surfaces.

2. A drill bushing as set forth in claim 1, wherein said flow passages are circumferentially arranged on said body intermediate said chip breaking surfaces.

3. A drill bushing as set forth in claim 2, wherein said flow passages each comprise a hole in the cylindrical wall of the body, said holes extending axially from said forward end face.

4. A drill bushing as set forth in claim 3, wherein said holes are convergent with the axis of the body and communicate with the outside surface of the body at a zone midway along the length of the bushing.

5. A drill bushing as set forth in claim 4, wherein said holes are drilled at an angle substantially in the range between 7° and 10° relative to the axis of said bushing.

6. A drill bushing as set forth in claim 4, wherein said bushing forms an assembly with an outer cylindrical sleevelike liner, said liner having precision formed, inside and outside cylindrical surfaces, the diameter of said inner surface being substantially equal to the outer diameter of said bushing, said liner having fluid channel means for supplying liquid to said bushing holes.

7. A drill bushing as set forth in claim 6, wherein said bushing body is nominally longer than said liner, whereby said forward bushing end face is adapted to extend axially forward of said liner when said liner is fully engaged with said bushing.

8. A drill bushing as set forth in claim 3, wherein said flow passage holes are spaced radially inward at said end face from the outer cylindrical surface of said bushing.

9. A method of improving machining efficiency comprising the steps of providing a cylindrical drill bushing, having a longitudinal axis, with circumferentially spaced chip breaking notches across an end face thereof and with flow passages intermediate the notches and convergently directed at a zone forward of said end face, said notches each being provided by forming first and second surfaces extending from inside to outside cylindrical sleeve surfaces, the first surface of each notch being formed in a plane parallel to said axis, the second surface of each notch being formed in a plane obliquely transverse to said axis such that said first and second surfaces intersect at a line spaced from said end face, securing the bushing in a jig plate with the end face a normal distance from the plate and ½ to 1 ½ tool diameters from the workpiece, feeding a tool axially through the drill bushing and simultaneously forcing a liquid coolant through the passages with sufficient velocity to impinge on the tool forward of the bushing to flush chips from the tool laterally into said chip breaking surfaces.

10. A drill bushing assembly comprising a cylindrical sleevelike bushing having a longitudinal axis and forward and rearward end faces, means on one of said end faces for locking said bushing against rotation in a jig plate, said forward end face lying in a plane transverse to the axis of the bushing, a plurality of circumferentially spaced drilled passages extending from said forward end face through the wall of the bushing to ports on the outer cylindrical surface of the bushing midway along its length, the passages converging towards the axis of the bushing at a zone forward of said end face, said passages being spaced away from said outer cylindrical surface at said forward end face, a series of chip breaking notches extending across the forward end face of the bushing from its inner cylindrical surface to its outer cylindrical surface, said notches intervening and being spaced from said passages, said chip breaking notches including chip shearing surface portions lying in substantially radial planes parallel to said axis, said notches also including chip clearance surface portions lying in planes obliquely transverse to said axis and intersecting said parallel planes, a cylindrical sleevelike liner on the outer cylindrical surface of the bushing, said liner having an inner cylindrical surface dimensioned to form a substantially fluid-tight seal on said outer bushing surface, said liner including an internal annulus communicating with each of said ports, a radial passage extending from the outer cylindrical surface of the liner to said annulus and adapted to supply liquid to the annulus and said ports, said liner being somewhat shorter in length than said bushing, whereby the bushing is adapted to be supported by the full length of the liner with its forward end face being disposed a normal distance from the liner to provide chip clearance between the assembly and a workpiece.

11. A drill bushing assembly comprising an inner cylindrical bushing member and an outer cylindrical sleevelike liner member each concentric with a common longitudinal axis, said bushing having a plurality of passages for directing liquid streams on a rotary tool extending through the bushing in a zone forward of the bushing, said passages being circumferentially spaced in the wall of the bushing, each of said passages extending from a hole in a forward end face of the bushing axially rearwardly and radially outwardly at an angle substantially in the range of 7° to 10° with the axis of the bushing, each of said passages terminating at a port on an outer surface of the bushing midway along its length, said outer liner having a bore forming a substantially fluid-tight fit with corresponding outer surfaces of sid bushing, an annular groove formed by one of said members, said groove being axially sealed by said fit between said members and in communication with said ports, said liner having a radial hole extending through its wall into communication with said groove, said bushing being a nominal size longer than said liner whereby said forward bushing end face is adapted to extend axially beyond said liner when the rearward ends of said members are aligned, said bushing member having chip breaking notches on said bushing end face intermediate said passage holes, each of said notches being defined by first and second surfaces extending between the inner surface to the outer surface of the bushing member each of said first surfaces lying in a plane parallel to said axis, and each of said second surfaces lying in a plane obliquely transverse to said axis and intersecting the respective parallel plane of the first surface.

* * * * *

UNITED STATES PATENT OFFICE
CERTIFICATE OF CORRECTION

PATENT NO. : 3,874,808
DATED : April 1, 1975
INVENTOR(S) : Richard A. Zaccardelli, Robert L. McClendon, & Donald R. Opatrny It is certified that error appears in the above-identified patent and that said Letters Patent are hereby corrected as shown below:

Under the caption "Description of the Prior Art", Column 1, Line 21 and continuing to Line 22, change "supply-ing" to -- cases -- .

In column 6, Line 34, change "sid" to -- said -- .

Signed and sealed this 17th day of June 1975.

(SEAL)
Attest:

RUTH C. MASON
Attesting Officer

C. MARSHALL DANN
Commissioner of Patents
and Trademarks